(12) United States Patent
Iwashita et al.

(10) Patent No.: US 7,956,568 B2
(45) Date of Patent: Jun. 7, 2011

(54) SERVO MOTOR CONTROLLER

(75) Inventors: Yasusuke Iwashita, Yamanashi (JP);
Tadashi Okita, Yamanashi (JP);
Hiroyuki Kawamura, Yamanashi (JP);
Yuuya Ueno, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 305 days.

(21) Appl. No.: 12/329,062

(22) Filed: Dec. 5, 2008

(65) Prior Publication Data

US 2009/0174357 A1  Jul. 9, 2009

(30) Foreign Application Priority Data

Jan. 4, 2008 (JP) .................... 2008-000133

(51) Int. Cl.
*G05D 23/275* (2006.01)
(52) U.S. Cl. .................. 318/632; 318/609; 318/610
(58) Field of Classification Search .......... 318/560, 318/432, 434, 632, 629, 609, 610
See application file for complete search history.

(56) References Cited

U.S. PATENT DOCUMENTS

| | | | | |
|---|---|---|---|---|
| 5,341,078 A | * | 8/1994 | Torii et al. | 318/568.22 |
| 6,083,082 A | * | 7/2000 | Saldana | 451/5 |
| 6,301,534 B1 | * | 10/2001 | McDermott et al. | 701/41 |
| 6,470,291 B1 | * | 10/2002 | Goker et al. | 702/145 |
| 7,115,066 B1 | * | 10/2006 | Lee | 477/15 |

FOREIGN PATENT DOCUMENTS

| | | |
|---|---|---|
| JP | 2253303 A | 10/1990 |
| JP | 7281707 A | 10/1995 |
| JP | 08-195043 A | 7/1996 |
| JP | 2003-316402 A | 11/2003 |
| JP | 2005245051 A | 9/2005 |

OTHER PUBLICATIONS

Notice of Reasons for Rejection for JP2008-000133 mailed Feb. 24, 2009.

* cited by examiner

*Primary Examiner* — Rina I Duda
(74) *Attorney, Agent, or Firm* — Lowe Hauptman Ham & Berner LLP

(57) ABSTRACT

A servo motor controller having: a frequency identification section that performs analysis based on a frequency response method and identifies the frequency of a disturbance exhibiting a specified phase lag; an input/output gain identification section that identifies the input/output gain at the frequency identified by the frequency identification section; and a magnification factor resetting section that resets an adjustment magnification factor by performing a specified operation on a ratio between the identified input/output gain and a specified target value of the input/output gain.

26 Claims, 9 Drawing Sheets

MAGNIFICATION FACTOR OF 100%

MAGNIFICATION FACTOR OF 484%

MAGNIFICATION FACTOR OF 368%

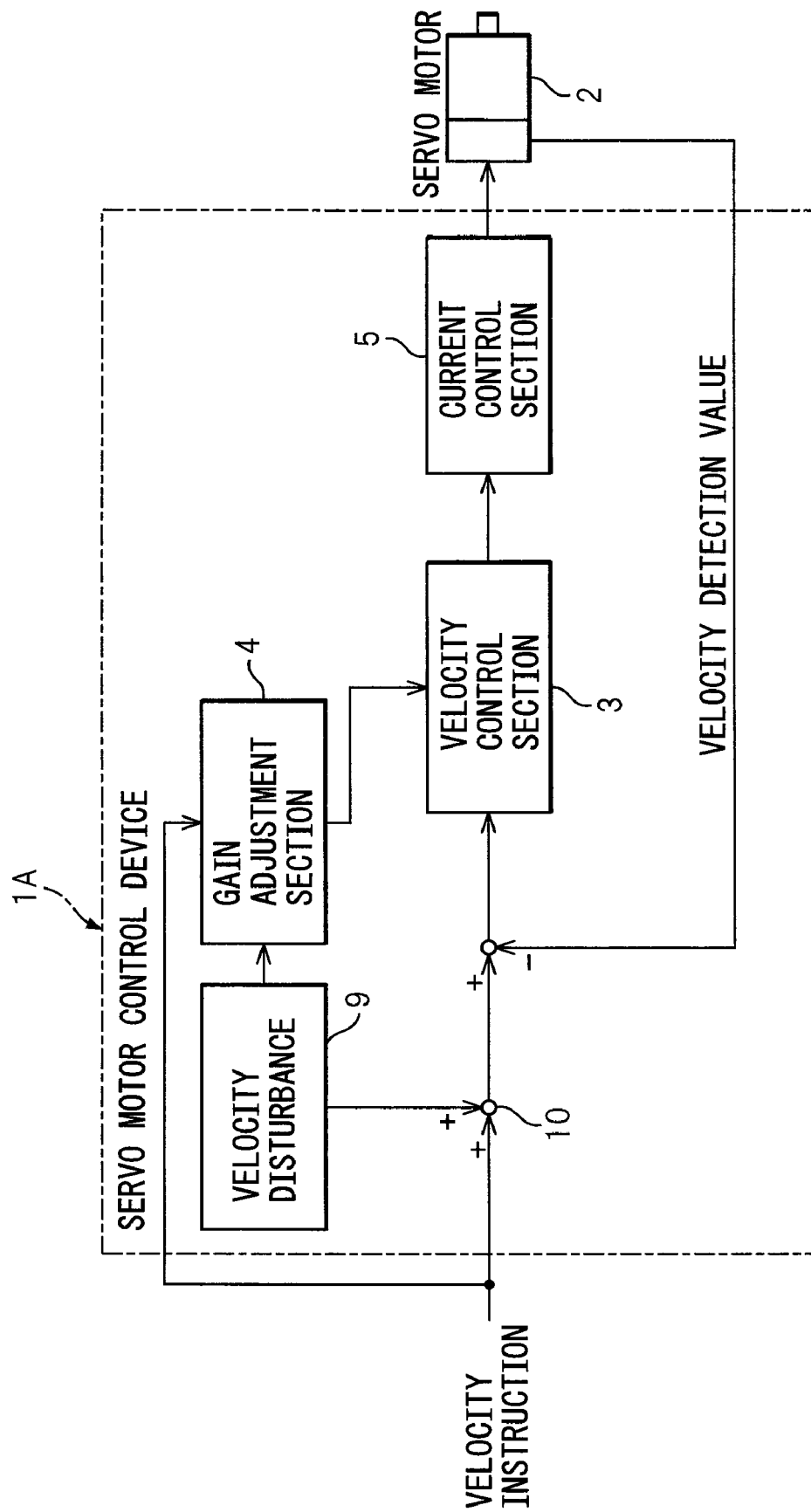

SERVO MOTOR CONTROLLER

CROSS REFERENCE TO RELATED APPLICATIONS

The present application claims the benefit of priority based on Japanese Patent Application No. 2008-000133, filed on Jan. 4, 2008, disclosure of which is incorporated herein in its entirety by reference.

BACKGROUND OF THE INVENTION

1. Field of the Invention

The present invention relates to a servo motor controller having automatic gain adjustment function capable of automatically adjusting velocity control gain in accordance with an object to be driven.

2. Description of Related Art

In general, in a servo motor controller, in order to improve the response of the velocity control, it is important to select a suitable velocity control gain in accordance with a driven object. Since an optimal value of the velocity control gain varies with an object driven by the motor, it is necessary to adjust the velocity control gain in accordance with the object to be controlled. An exemplary method of adjusting the velocity control gain, known to those skilled in the art, is to perform analysis based on a frequency response method, and to observe the gain margin and the phase margin of the input/output gain, and based on an observed value, to set an adjustment magnification factor for an operation constant.

However, in a method in which the gain margin is observed, for example, it has been found that, when adjustment is performed by setting the adjustment magnification factor based on the ratio of the observed gain margin to the gain of −3 dB so that the input/output gain of −3 dB may be obtained at a frequency corresponding to the phase lag of −180°, the resulting input/output gain obtained by actually using the set adjustment magnification factor exceeds −3 dB. The resulting input/output gain exceeds −3 dB because the relation between the operation constant and the input/output gain of the frequency response of the velocity control is not an exact proportional relation. It has also been found that, when only the gain margin is observed, the input/output gain may become large at frequencies other than the frequency corresponding to the phase lag of −180°.

As another example of prior art, a gain adjustment method of adjusting gain of a positioning control system applied to a control system for positioning a HDD head is disclosed in Japanese Patent Publication No. H08-195043. In paragraph 0007, Japanese Patent Publication No. H08-195043 includes a description that "the system comprises detection means that output the positional error signal corresponding to the positional error between the present position and the target position of a head, and compares the amplitude of the reference measurement signal with the positional error signal and adjusts the system gain so as to bring the comparison results into coincidence."

As still another example of prior art, a drive controller that is capable of identifying frequency characteristics is disclosed in Japanese Patent Publication No. 2003-316402. In paragraph 0056, Japanese Patent Publication No. 2003-316402 includes a description that "a servo motor is controlled by adding a specified signal (a signal consisting of sine waves of different frequencies successively outputted or a signal consisting of overlapped sine waves of plural different frequencies and of same amplitude) to a current instruction value generated from a position instruction value, and by using the addition result to control the servo motor. On the other hand, response of the servo motor (velocity feed-back value, position feed-back value, current feed-back value, or the like) is measured, and the amount of the features which is the result of a predetermined operation performed on the measurement result (difference between the maximum value and the minimum value of the response of the servo motor) is compared with a prescribed target value. When, for example, the amount of features is not within a certain range, the amplitude of the specified signal is caused to fluctuate so that the amount of features and the target value come closer to each other. After this adjustment is performed repeatedly, and when the amount of features enters into a specified range, it is judged that the frequency characteristic is obtained in sufficient precision. Thus, since the frequency characteristic can be identified by using the specified signal that has been adjusted in an optimal state, identification of the frequency characteristic can be achieved in high precision even if the feedback control system changes."

SUMMARY OF THE INVENTION

It is an object of the present invention to provide a servo motor controller having automatic gain adjustment function that is capable of adjusting the velocity control gain easily and accurately and thereby improving the reliability of the servo motor control.

In order to attain above object, in accordance with an aspect of the present invention, there is provided a servo motor controller having automatic gain adjustment function for adjusting a velocity control gain, comprising a velocity control section that calculates a torque instruction value by multiplying a velocity deviation which is a difference between a velocity instruction value and a velocity detection value by the velocity control gain which is a product of an operation constant and an adjustment magnification factor set in advance for adjusting the operation constant, a disturbance addition section that adds a disturbance at a specified frequency to the velocity instruction value or to the torque instruction value, an input/output characteristic estimation processing section that estimates an input/output gain and a phase lag with the disturbance as an input value of a control system and with the velocity instruction value or the torque instruction value as an output value of the control system, a frequency identification section that performs an analysis based on a frequency response method and identifies a frequency of the disturbance exhibiting a specified phase lag, an input/output gain identification section that identifies an input/output gain at the frequency identified by the frequency identification section, and a magnification factor resetting section that resets the adjustment magnification factor by performing a specified operation on a ratio between the identified input/output gain and a specified target value of the input/output gain.

With such construction, it is possible to automatically adjust the velocity control gain easily and accurately so as to bring the identified input/output gain closer to the specified target value of the input/output gain, and to thereby improve the response (reliability) of the servo motor control.

In the servo motor controller, the magnification factor resetting section resets the adjustment magnification factor by multiplying the adjustment magnification factor by a value obtained from the ratio of the identified input/output gain to the specified target value of the input/output gain multiplied by a specified correction coefficient. With such construction, the range of variation of the adjustment magnification factor can be increased, and the degree of freedom of adjustment in a constant period can be increased.

In the servo motor controller, it is also possible for the magnification factor resetting section to reset the adjustment magnification factor by multiplying the adjustment magnification factor by a value obtained by subtracting 1 from the ratio of the identified input/output gain to the specified target value of the input/output gain, and then multiplying a specified correction coefficient that is less than 1, and finally adding 1. With such construction, the change of the adjustment magnification factor can be tempered. Further, it is possible to eliminate the case where the correction ratio that is judged to be 1 or higher (magnification factor to be increased) is calculated to be less than 1 (magnification factor decreased), and vice versa, so that more stable adjustment of the velocity control gain can be achieved.

In the servo motor controller, it is also possible to choose the disturbance as a sine wave disturbance. With this choice, analysis can be performed based on the frequency response method to achieve an accurate adjustment of the velocity control gain.

In the servo motor controller, the frequency identified by the frequency identification section may be a frequency at which the phase lag is equal to or comparable to −180° or has smaller absolute value, and with the specified target value of the input/output gain set to a specified value of 0 dB or less, it is also possible to perform the adjustment so as to bring the input/output gain at the frequency closer to the specified target value of the input/output gain. With such construction, since the frequency identified by the frequency identification section is a frequency at which the phase lag is equal or comparable to −180° or has smaller absolute value, the requirement for adjustment of the velocity control gain in the frequency region which permits the control system to respond, can be met.

In the servo motor controller, the device may further comprise a maximum gain calculation section that obtains a maximum value of the input/output gain at a frequency lower than the frequency identified by the frequency identification section, wherein, if the maximum value is greater than the specified value of 0 dB or higher, the adjustment magnification factor of the velocity control section can be decreased in a ratio of the maximum value to the specified value of 0 dB or higher. With such construction, the reliability of the control can be improved in the frequency region lower than the frequency identified by the frequency identification section. This is the frequency region in which the control can respond, and there is no problem even if the gain somewhat exceeds 0 dB. However, for the sake of safety, the stability of the control can be improved by decreasing the operation constant, for example, when the maximum value exceeds 5 to 10 dB.

In the servo motor controller, when an input/output gain at a resonance frequency exceeds the specified value at a frequency higher than the frequency identified by the frequency identification section, it is also possible to decrease the adjustment magnification factor in accordance with a ratio of the input/output gain at the resonant frequency to the specified value. In this manner, instability or inability of the control at a resonant frequency can be prevented. Since the control cannot respond sufficiently at frequencies higher than the frequency at which the adjustment magnification factor is obtained, the input/output gain has to be decreased to about −3 to −10 dB. When a value greater than the specified value of 0 dB or less is observed, stability of the control can be improved by decreasing the operation constant.

Also in the servo motor controller, after the adjustment magnification factor has been reset, an input/output gain can be determined based on a newly set adjustment magnification factor, and a resetting of the adjustment magnification factor can be repeated so as to bring the input/output gain closer to the specified target value of the input/output gain, until the resetting can be terminated when the input/output gain enters into a specified range including the specified target value of the input/output gain. With such construction, since, after the adjustment magnification factor has been reset, the input/output gain is determined based on a newly set adjustment magnification factor, and the resetting of the adjustment magnification factor is repeated so as to bring the input/output gain closer to the specified target value of the input/output gain, until the resetting is terminated when the input/output gain enters into a specified range including the specified target value of the input/output gain, the proper adjustment magnification factor can be obtained more accurately.

Also in the servo motor controller, the correction coefficient used in a second time resetting of the adjustment magnification factor can be chosen to be greater than the correction coefficient used in a first time resetting of the adjustment magnification factor. With such construction, for example, by employing a value as small as 0.6 for the correction coefficient used in the first time resetting, and a greater value close to 1 for the correction coefficient used in the second time resetting to obtain the adjustment magnification factor, the value closer to the target value of the input/output gain can be obtained each time the adjustment is repeated. Although the adjustment magnification factor is generally determined at a frequency at which the phase lag is −180°, the phase lag can be arbitrarily set in the range of about −90° to −180° if the selected frequency is interpreted as the limit of frequencies permitting response to the control, and by setting the frequency at a higher value, the detection error can be reduced and the adjustment magnification factor can be obtained more stably.

BRIEF DESCRIPTION OF THE DRAWINGS

The above and other objects, features and advantages of the present invention will become more apparent from the following description of preferred embodiments thereof with reference to appended drawings, in which:

FIG. 14 is a block diagram as a variant of the block diagram of FIG. 1, showing addition of the velocity disturbance to the velocity instruction value.

DETAILED DESCRIPTION

The present invention will be described in detail below with reference to the drawings. Servo motor controller 1 according to the present invention controls servo motor 2 as a driving source for operating a driven object such as a joint of an industrial robot or a table of a machine tool.

Figure 1:
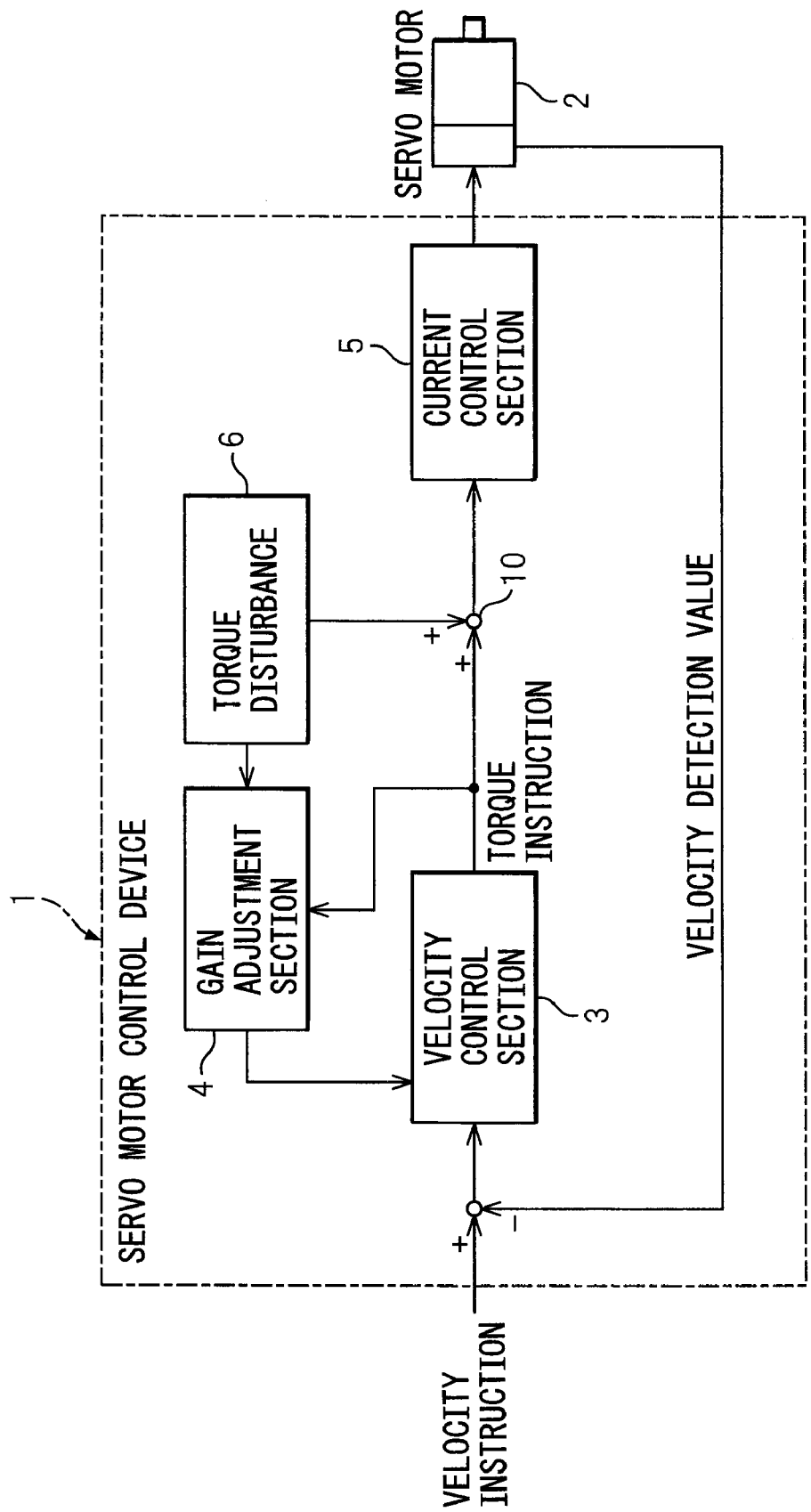
FIG. 1 is a block diagram of the flow of control instructions from an unshown superior controller to a servo motor via a servo motor controller device according to the present invention.

FIG. 1 is a block diagram of the flow of control instructions from an unshown superior controller to servo motor 2 via servo motor controller 1. As shown, servo motor controller 1 has velocity control section 3 that outputs a torque instruction value by multiplying a velocity deviation which is a difference between a velocity instruction value and a velocity detection value by a velocity control gain, current control section 5 that inputs the torque instruction value added by torque disturbance 6 to output a current instruction value, and gain adjustment section 4 that automatically adjusts the velocity control gain of velocity control section 3. The current instruction value is provided to servo motor 2 from current control section 5 via an unshown servo amplifier to operate an object to be driven such as a robot or a machine tool.

Figure 2:
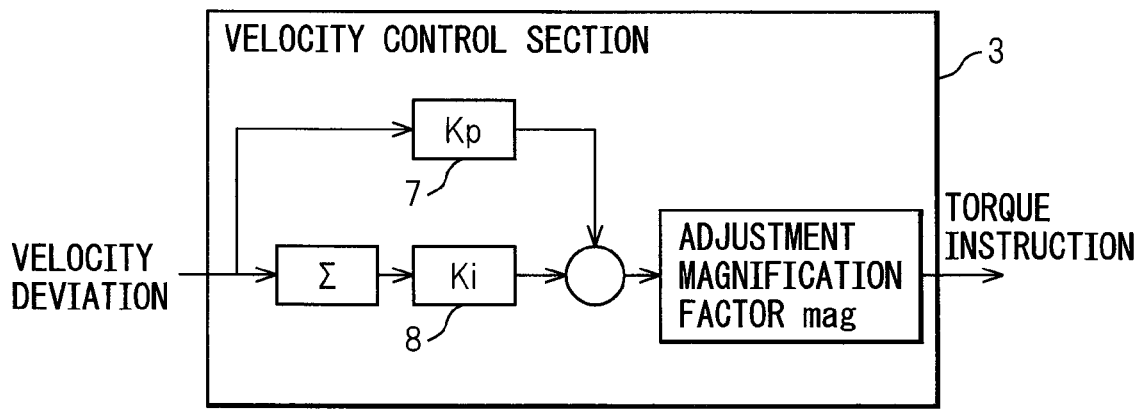
FIG. 2 is an enlarged view of the velocity control section shown in FIG. 1.

Referring to FIG. 2, velocity control section 3 will be described in further detail below. Velocity control section 3 adds, to a value obtained by multiplying the velocity deviation which is the difference between the velocity instruction value and the velocity detection value by velocity proportional gain (operation constant) 7, a value obtained by multiplying a velocity integration value by a velocity integration gain (operation constant), and multiplies the resulting value by specified adjustment magnification factor mag to output the torque instruction value. The comprehensive gain obtained by multiplying the velocity proportional gain and the velocity integration gain by adjustment magnification factor mag is defined as the velocity control gain in this specification.

Figure 3:
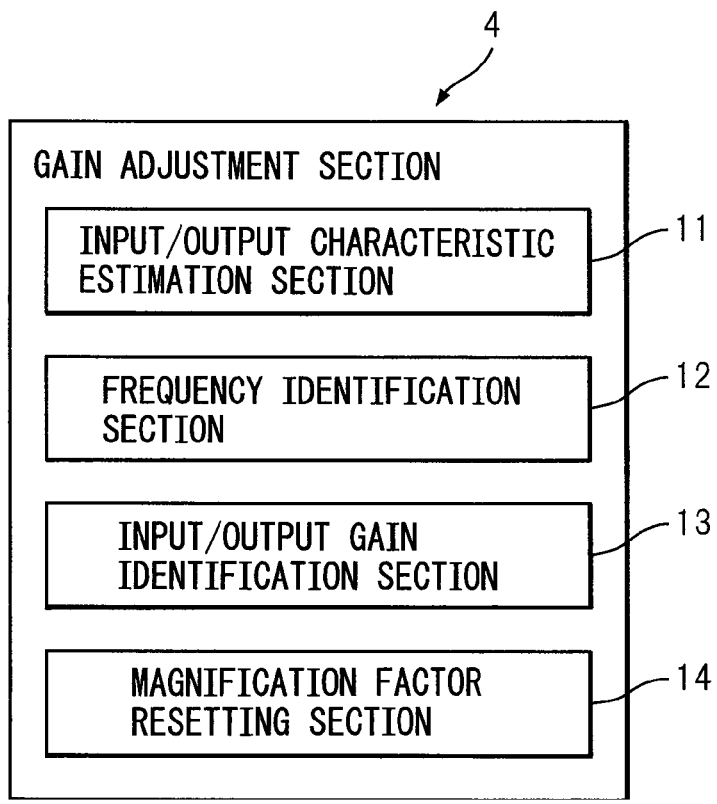
FIG. 3 is a view of the construction of the gain adjustment section.

As shown in FIG. 3, the gain adjustment section 4 has input/output characteristic estimation processing section 11 that estimates the input/output gain and the phase lag with torque disturbance 6 as an input value to a control system and with the torque instruction value as an output value of the control system, frequency identification section 12 that, while varying the frequency of torque disturbance 6, identifies the frequency of torque disturbance 6 exhibiting a specified phase lag, input/output gain identification section 13 that identifies the input/output gain at the frequency identified by frequency identification section 12, and magnification factor resetting section 14 that sets adjustment magnification factor by multiplying adjustment magnification factor mag by the ratio of the identified input/output gain to the target value of the input/output gain multiplied by a specified correction coefficient α. Such gain adjustment section 4 is adapted to automatically set adjustment magnification factor.

Next, referring to FIGS. 4-7, the method for determining the correction coefficient α in magnification factor resetting section 14 will be described.

Figure 4:
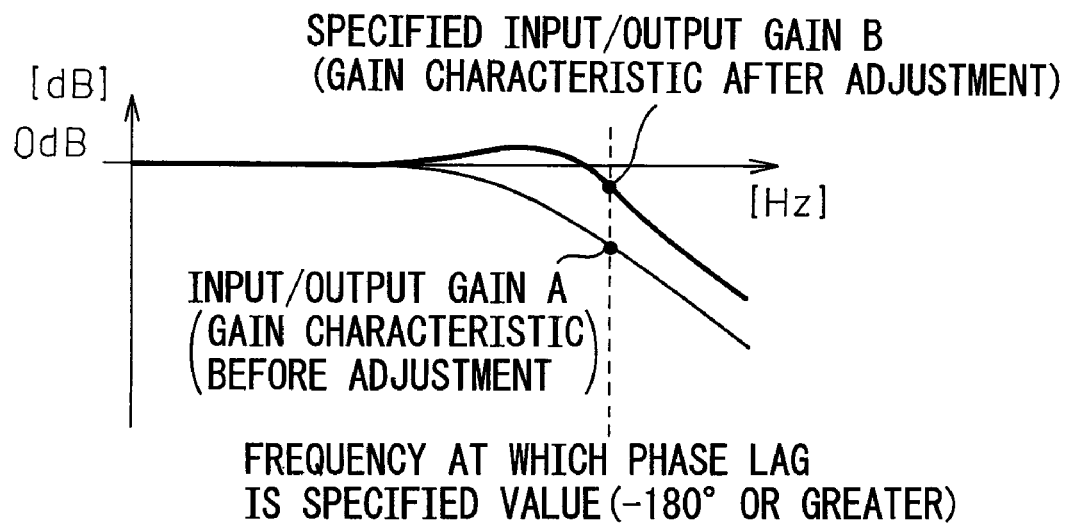
FIG. 4 is a Bode diagram for explaining a method for determining the correction coefficient α.

As shown in FIG. 4, when adjustment is made to multiply input/output gain A by ratio X so as to bring it close to input/output gain B (specified target value of gain), since "dB value=20 log input/output magnification factor", input/output gain A=20 log input/output magnification factor A, input/output magnification factor A=$10^{input/output\ gain\ A/20}$,
and input/output gain B=20 log input/output magnification factor B, input/output magnification factor B=$10^{input/output\ gain\ B/20}$.

Thus, ratio X of input/output gain B as seen from input/output gain A can be obtained as $$\text{ratio } X = \frac{\text{input/output gain } B}{\text{input/output gain } A}$$

$$= \frac{10^{input/output\ gain\ B/20}}{10^{input/output\ gain\ A/20}}$$

$$= 10^{(input/output\ gain\ B - input/output\ gain\ A)/20}.$$

Figure 5:
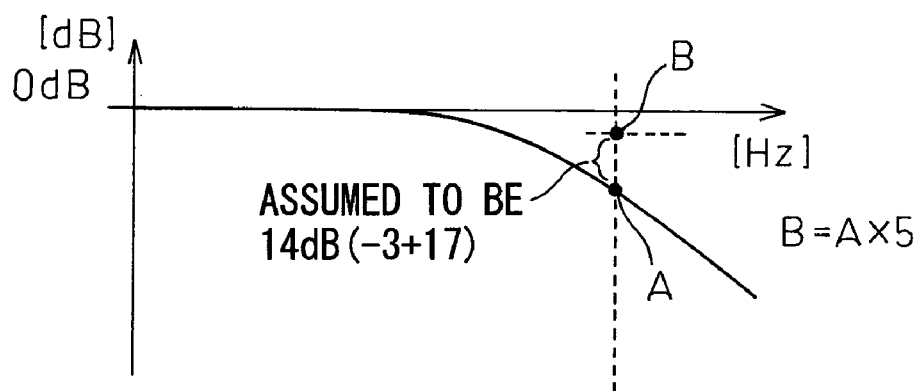
FIG. 5 is a view useful for explaining the ratio X in the Bode diagram of the gain in FIG. 4.
Figure 6:
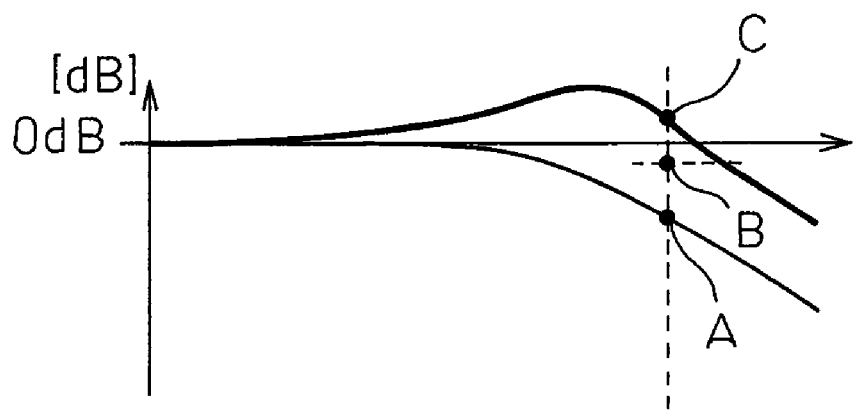
FIG. 6 is a view for explaining the adjusted input/output gain C.
Figure 7:
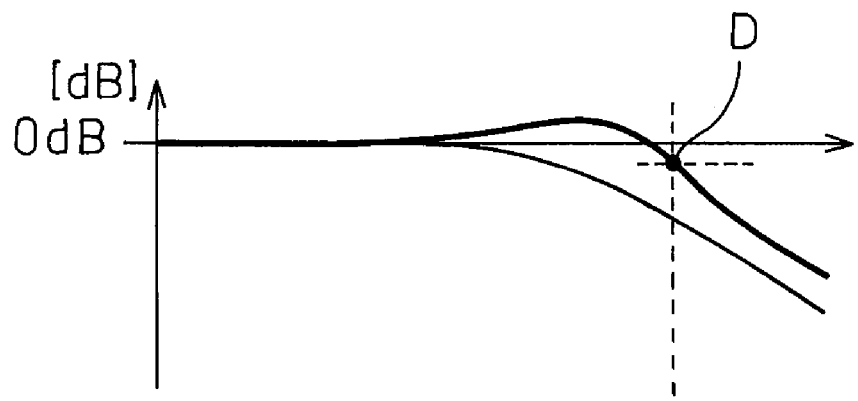
FIG. 7 is a view for explaining the adjusted input/output gain D.

In FIG. 5, it is shown that input/output gain B is five times the value of input/output gain A. However, due to non-linearity of the machine, the characteristic of input/output gain B cannot be obtained simply by multiplying adjustment magnification factor mag of velocity control section 3 by ratio X (5 in this example), and as shown in FIG. 6, the result turns out to be input/output gain C which exceeds input/output gain B. The amount of the excess varies with the environmental conditions such as the construction of the machine, load, and the like (considered to be the difference of the servo motor characteristics).

Therefore, it is attempted to define correction coefficient α such that ratio X multiplied by α can be multiplied to adjustment magnification factor mag in order to prevent excessive increase of input/output gain C. Here, it is conceivable that ratio X of 1 or greater may become less than 1 (the input/output gain that should be increased may be decreased). However, since the amount of change is large, the degree of freedom for adjustment in a constant period is increased.

As a method for determining the correction coefficient α, it is desirable that input/output gain D obtained by multiplying the adjustment magnification factor by Xα become closer to B than A, that is, it is desirable that α be determined in the range such that |D−B|<|B−A|. This can be achieved as follows.

When B≦D, this can be achieved by selecting α to be a value (=β$^+$) slightly larger than 1/X (the lower limit of α). And, let the value of α for which D−B=B−A be γ, then α can be arbitrarily selected in the range such that β$^+$<α<β. It is ideal that, in the range β<α<γ, α can be identified for which the input/output gain is equal to specified input/output gain B. However, even if α is arbitrarily selected in the range such that β$^+$<α<γ, there is no problem since the input/output gain necessarily becomes closer to specified input/output gain B by definition.

When B>D, this can be achieved by selecting α to be a value (=β$^−$) slightly smaller than 1/X (the upper limit of α). And, let the value of α for which B−D=A−B be γ, then α can be arbitrarily selected in the range such that γ<α<β$^−$. It is ideal that, in the range γ<α<β$^−$, α can be identified for which the input/output gain is equal to specified input/output gain B. However, even if α is arbitrarily selected in the range such that $\gamma<\alpha<\beta^-$, there is no problem since the input/output gain necessarily becomes closer to specified input/output gain B by definition.

The correction coefficient $\alpha$ less than 1 can be determined as described above, and as shown in FIG. 7, input/output gain D that is closer to specified input/output gain B can be obtained.

Figure 8:
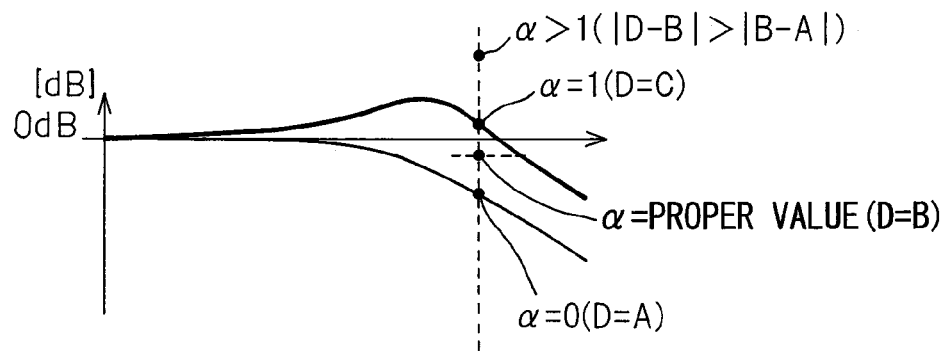
FIG. 8 is a Bode diagram for explaining another method for determining the correction coefficient α.

Next, referring to FIG. 8, another method for determining the correction coefficient $\alpha$ will be described below.

Unlike the previous method in which the correction coefficient $\alpha$ less than 1 is determined and is directly multiplied to ratio X, in this method, as shown in equation (1), B−A (change of A) is multiplied by a to temper the change so as to bring $\alpha$ closer to B.

$$\{A+(B-A)\times\alpha\}/A=1+(X-1)\times\alpha \qquad (1)$$

Thus, input/output gain D is obtained as the input/output gain using adjustment magnification factor multiplied by equation (1). As a method for determining the correction coefficient $\alpha$, it is necessary that input/output gain D become closer to B than A, that is, it is necessary that $\alpha$ be determined in the range such that |D−B|<|B−A|. As shown in FIG. 8, since D=A when $\alpha$=0, the requirement that |D−B|<|B−A| can be always met if $\alpha$ is set to a positive value close to 0. As the value of $\alpha$ increases, D increases monotonically (or decreases monotonically), and there is a point at which |D−B| becomes infinitely close to 0. When $\alpha$ increases further, the requirement |D−B|<|B−A| is no longer satisfied (|D−B|>|B−A|), and the input/output gain after adjustment departs further from specified input/output gain B than before adjustment. In summary, let the value of $\alpha$ for which D−B=A−B be $\gamma$, then $\alpha$ can be arbitrarily selected in the range such that 0<$\alpha$<$\gamma$.

In this method, it is difficult to obtain the optimum $\alpha$ in one trial, but it is possible to approach securely to specified input/output gain B. Since a series of operations do not require manual input of information or the like, this process can be said to be an automatic adjustment.

Since this method has a feature of tempering the change in magnification factor, the number of steps may be increased when a large change in the magnification factor is required. But, since the possibility that ratio X of 1 or higher (magnification factor to be increased) is decreased to less than 1 (decreased magnification factor) is eliminated, more stable adjustment can be performed.

Figure 9:
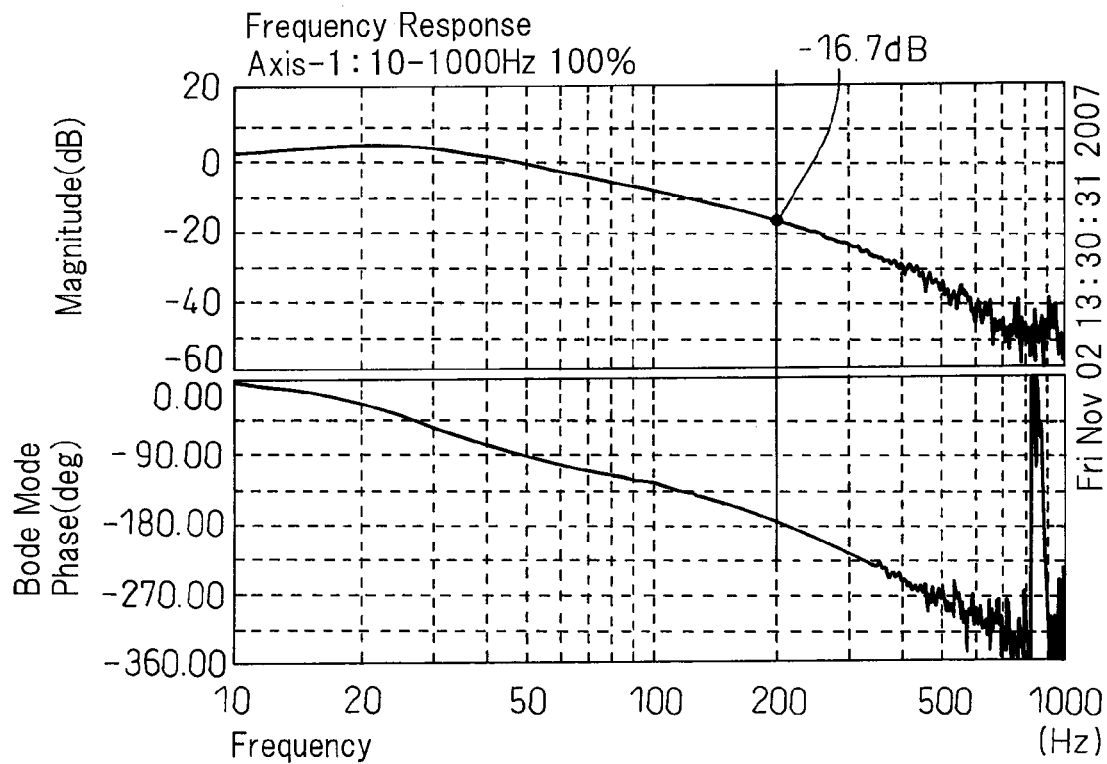
FIG. 9 is a Bode diagram before adjustment of magnification factor of 100%.
Figure 10:
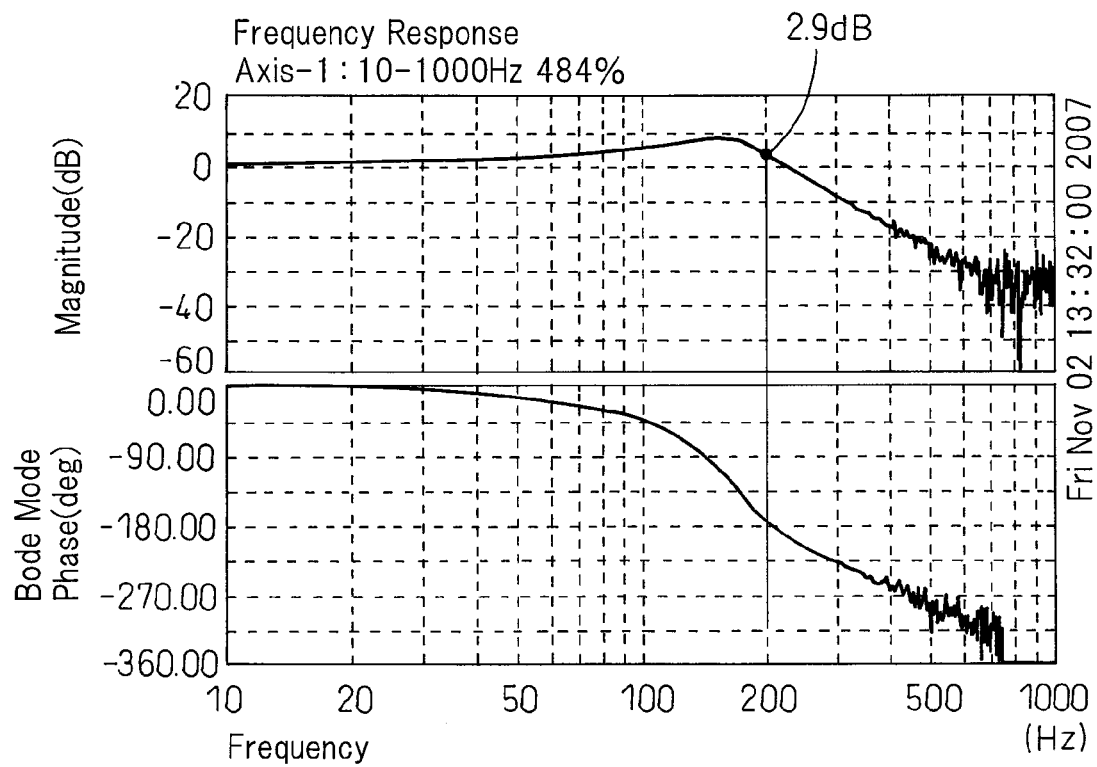
FIG. 10 is a Bode diagram after adjustment of magnification factor of 484%.
Figure 11:
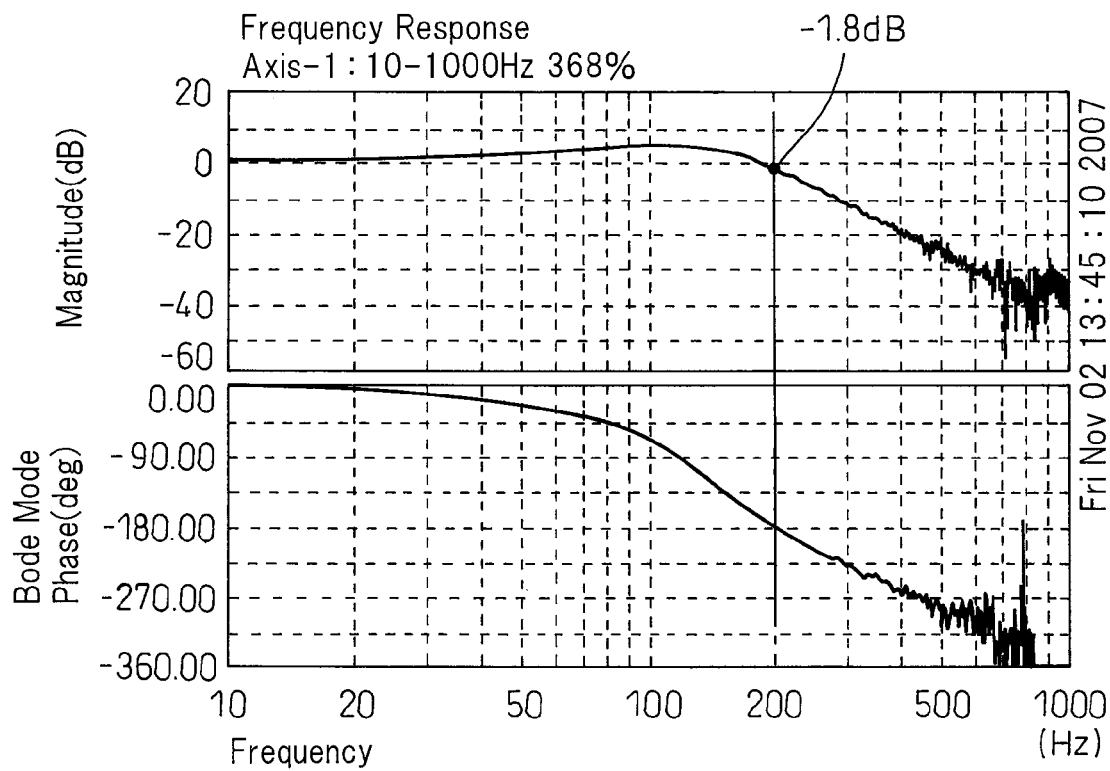
FIG. 11 is a Bode diagram after adjustment of magnification factor of 368%.

FIGS. 9-11 show Bode diagrams before adjustment and after adjustment.

FIG. 9 is a Bode diagram before adjustment with the magnification factor of 100%. In this Figure, the input/output gain at the frequency at which the phase lag is −180° is −16.7 dB. Thus, if the target value of the input/output gain is set to −3 dB, ratio X of the target value to the measured value (analysis value) of the input/output gain is $10^{(-3+16.7)/20}$=4.84. By multiplying the magnification factor 100% by this ratio X, adjustment magnification factor mag is determined to be 484%.

FIG. 10 shows a Bode diagram with the correction magnification factor of 484%. In this Figure, the input/output gain at a frequency where the phase lag is −180° is 2.9 dB. This shows that the obtained input/output gain is higher by 5.9 dB than the target value of the input/output gain of −3 dB. Here, correction coefficient $\alpha$ is obtained as (−3+16.7)/(2.9+16.7)=0.699. From equation (1), (4.84−1)×0.699+1=3.68 is obtained and the adjustment magnification factor is determined to be 368%.

FIG. 11 shows a Bode diagram with the correction magnification factor of 368%. In this Figure, the input/output gain at a frequency where the phase lag is −180° is −1.8 dB. Thus, the result obtained is very close to the target value of the input/output gain of −3 dB.

Figure 12:
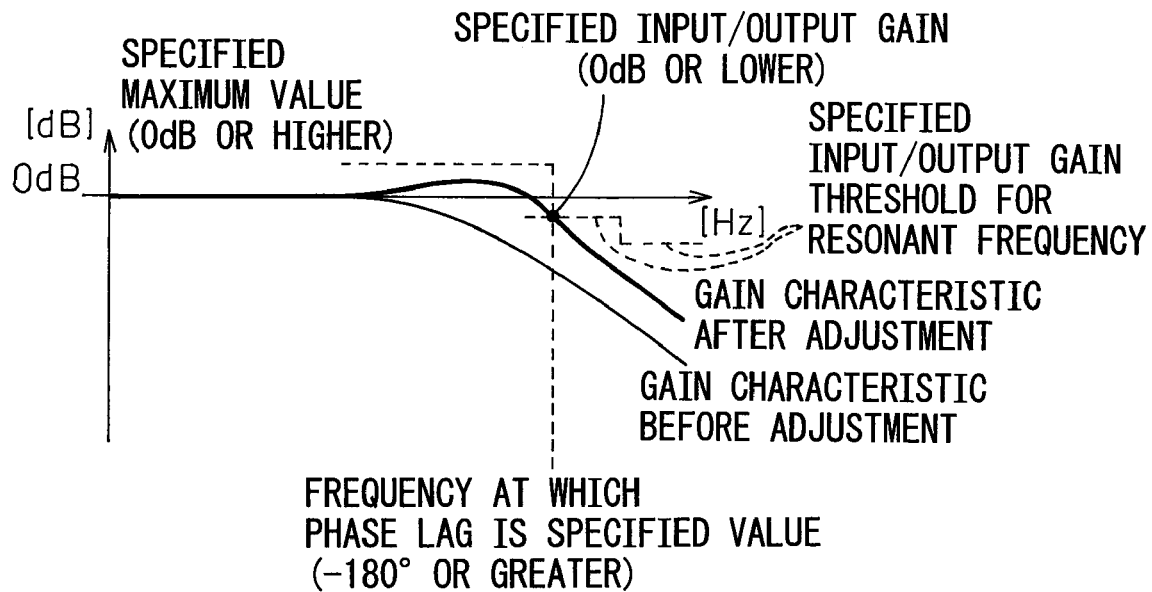
FIG. 12 is a view for explaining the threshold value of the gain after adjustment.

Next, referring to FIG. 12, a gain threshold value of the input/output gain will be described. In the frequency region where the phase lag is about −180° or has smaller absolute value, by setting the adjustment magnification factor such that the maximum value of the input/output gain should not exceed a specified value of 0 dB or higher (for example, about 5 to 10 dB), stability can be secured in the frequency region where the control can respond. In the frequency region where the phase lag has larger absolute value than −180°, the magnification factor is adjusted such that the input/output gain is kept in the range of −3 to −10 dB or lower. Since, in this frequency region, the control cannot sufficiently respond, and instability of the control at resonant frequency can be avoided by suppressing the gain.

In the frequency region where the phase lag is near −180°, since the reflection of the output torque by the control is in the same direction as the input torque, the output will diverge when the gain exceeds 0 dB (that is, magnification factor of 1). Therefore, the magnification factor is adjusted such that the input/output gain in the frequency region where the phase lag is specified lag near −180° does not exceed the specified value of 0 dB or lower. In the frequency region where the phase lag has smaller absolute value than the phase lag −180°, although there is no problem even if the gain exceeds 0 dB to some extent, the magnification factor is adjusted such that the maximum value of the gain does not exceed 5 ~to 10 dB. The maximum value of the input/output gain is calculated by the maximum gain calculation section, and when the maximum value exceeds 5 to 10 dB, the adjustment magnification factor is adjusted to be lowered by the ratio determined by the difference between the maximum value and the specified threshold value.

Figure 13:
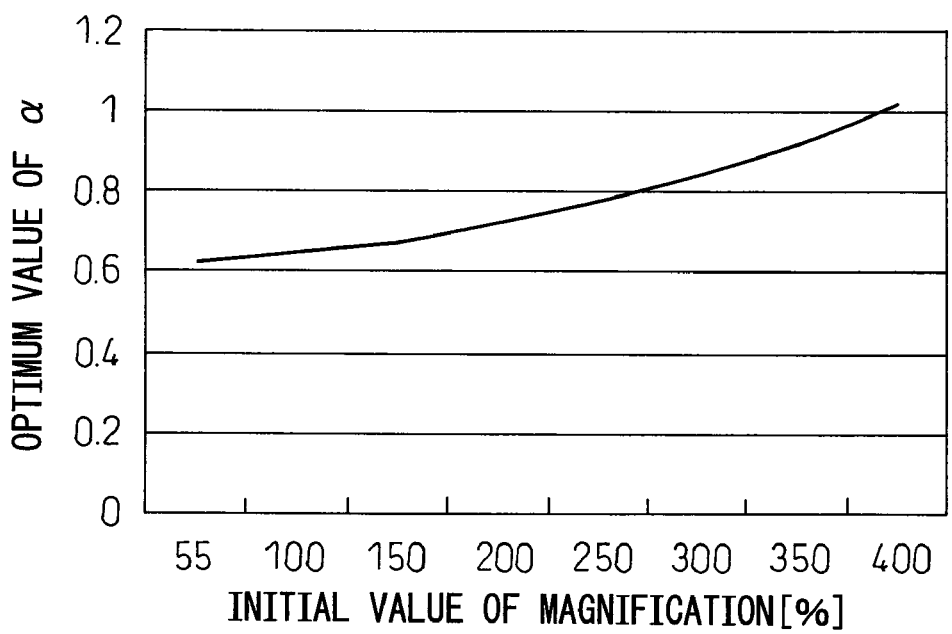
FIG. 13 is a view for explaining the relation between the initial value of the magnification factor and the optimum value of α.

FIG. 13 is a view of the relation between the initial value of the magnification factor and the optimum value of correction coefficient $\alpha$. Here, the expression "the initial value of the magnification factor" refers to the value of the magnification factor that has been set by the manufacturer of the controller, or by the user of the controller before using the controller, and the expression "the optimum value of $\alpha$" refers to such value of $\alpha$ where the ratio of the input/output gain is determined at the initial value of the magnification factor shown in horizontal axis, and the initial value of the magnification factor is multiplied by this ratio multiplied by $\alpha$, and the input/output gain determined with the new magnification factor coincides with the specified target value of the input/output gain. The smaller the initial value of the magnification factor is, the smaller is the optimum value of $\alpha$. As an example, as can be seen from the result of FIGS. 9-11, when the initial value of the magnification factor is 10%, correction coefficient $\alpha$ is determined to be 0.68. Although the relation between the initial value of the magnification factor and the optimum value of $\alpha$ is not defined unambiguously for all controls, it can be used as a tendency common to all controls.

The present invention is not limited to the embodiment described above, but can be carried out in various modifications without departing from the scope and spirit of the invention. For example, although, in the present embodiment, as shown in FIG. 1, torque disturbance 6 is added to the torque instruction value, it is also possible, as shown in FIG. 14, to add velocity disturbance 9 to the velocity instruction value to reset the adjustment magnification factor.

The invention claimed is:

1. A servo motor controller having automatic gain adjustment function for adjusting a velocity control gain, comprising:
   a velocity control section that calculates a torque instruction value by multiplying a velocity deviation which is a difference between a velocity instruction value and a velocity detection value by said velocity control gain which is a product of an operation constant and an adjustment magnification factor which has been set in advance for adjusting said operation constant;
   a disturbance addition section that adds a torque disturbance at a specified frequency to said torque instruction value;
   an input/output characteristic estimation section that estimates an input/output gain and a phase lag with said torque disturbance as an input value to a control system and with said torque instruction value as an output value from said control system;
   a frequency identification section that performs analysis based on a frequency response method and identifies a frequency of said torque disturbance exhibiting a specified phase lag;
   an input/output gain identification section that identifies an input/output gain at said frequency identified by said frequency identification section; and
   a magnification factor resetting section that resets said adjustment magnification factor by multiplying said adjustment magnification factor by a value obtained by multiplying a specified correction coefficient that is less than 1 to a ratio between said identified input/output gain and said specified target value of said input/output gain.

2. The servo motor controller according to claim 1, wherein said torque disturbance represents a sine wave.

3. The servo motor controller according to claim 1, wherein said frequency identified by said frequency identification section is a frequency at which said phase lag is about −180° or has a smaller absolute value, and wherein, with said specified target value of said input/output gain set to a specified value of 0 dB or lower, an adjustment is performed so as to bring a input/output gain at said frequency identified by said frequency identification section closer to said specified target value of the input/output gain.

4. The servo motor controller according to claim 1, further comprising a maximum gain calculation section that obtains a maximum value of said input/output gain at a frequency lower than said frequency identified by said frequency identification section, wherein, when said maximum value is greater than a specified value of 0 dB or higher, said adjustment magnification factor of said velocity control section is decreased by a ratio of said maximum value to said specified value of 0 dB or higher.

5. The servo motor controller according to claim 1, wherein, when an input/output gain at a resonant frequency exceeds a specified value at a frequency higher than said frequency identified by said frequency identification section, said adjustment magnification factor of said velocity control section is decreased in accordance with a ratio of said input/output gain at said resonant frequency to said specified value.

6. The servo motor controller according to claim 1, wherein, after said adjustment magnification factor has been reset, an input/output gain is determined by using a new adjustment magnification factor, and resetting of said adjustment magnification factor is repeated to bring said input/output gain determined by using a new adjustment magnification factor closer to said specified target value of said input/output gain until resetting is terminated when said input/output gain determined by using a new adjustment magnification factor enters into a specified range including said specified target value of said input/output gain.

7. The servo motor controller according to claim 6, wherein said specified correction coefficient used in resetting of said adjustment magnification factor for a second time is larger than said specified correction coefficient used in resetting of said adjustment magnification factor for a first time.

8. A servo motor controller having automatic gain adjustment function for adjusting a velocity control gain, comprising:
   a velocity control section that calculates a torque instruction value by multiplying a velocity deviation which is a difference between a velocity instruction value and a velocity detection value by said velocity control gain which is a product of an operation constant and an adjustment magnification factor which has been set in advance for adjusting said operation constant;
   a disturbance addition section that adds a velocity disturbance at a specified frequency to said velocity instruction value;
   an input/output characteristic estimation section that estimates an input/output gain and a phase lag with said velocity disturbance as an input value to a control system and with said velocity instruction value as an output value from said control system;
   a frequency identification section that performs analysis based on a frequency response method and identifies a frequency of said velocity disturbance exhibiting a specified phase lag;
   an input/output gain identification section that identifies an input/output gain at said frequency identified by said frequency identification section; and
   a magnification factor resetting section that resets said adjustment magnification factor by multiplying said adjustment magnification factor by a value obtained by multiplying a specified correction coefficient that is less than 1 to a ratio between said identified input/output gain and said specified target value of said input/output gain.

9. The servo motor controller according to claim 8, wherein said velocity disturbance represents a sine wave.

10. The servo motor controller according to claim 8, wherein said frequency identified by said frequency identification section is a frequency at which said phase lag is about −180° or has a smaller absolute value, and wherein, with said specified target value of said input/output gain set to a specified value of 0 dB or lower, an adjustment is performed so as to bring a input/output gain at said frequency identified by said frequency identification section closer to said specified target value of the input/output gain.

11. The servo motor controller according to claim 8, further comprising a maximum gain calculation section that obtains a maximum value of said input/output gain at a frequency lower than said frequency identified by said frequency identification section, wherein, when said maximum value is greater than a specified value of 0 dB or higher, said adjustment magnification factor of said velocity control section is decreased by a ratio of said maximum value to said specified value of 0 dB or higher.

12. The servo motor controller according to claim 8, wherein, when an input/output gain at a resonant frequency exceeds a specified value at a frequency higher than said frequency identified by said frequency identification section, said adjustment magnification factor of said velocity control section is decreased in accordance with a ratio of said input/output gain at said resonant frequency to said specified value.

13. The servo motor controller according to claim 8, wherein, after said adjustment magnification factor has been reset, an input/output gain is determined by using a new adjustment magnification factor, and resetting of said adjustment magnification factor is repeated to bring said input/output gain determined by using a new adjustment magnification factor closer to said specified target value of said input/output gain until resetting is terminated when said input/output gain determined by using a new adjustment magnification factor enters into a specified range including said specified target value of said input/output gain.

14. The servo motor controller according to claim 13, wherein said specified correction coefficient used in resetting of said adjustment magnification factor for a second time is larger than said specified correction coefficient used in resetting of said adjustment magnification factor for a first time.

15. A servo motor controller having automatic gain adjustment function for adjusting a velocity control gain, comprising:
- a velocity control section that calculates a torque instruction value by multiplying a velocity deviation which is a difference between a velocity instruction value and a velocity detection value by said velocity control gain which is a product of an operation constant and an adjustment magnification factor which has been set in advance for adjusting said operation constant;
- a disturbance addition section that adds a torque disturbance at a specified frequency to said torque instruction value;
- an input/output characteristic estimation section that estimates an input/output gain and a phase lag with said torque disturbance as an input value to a control system and with said torque instruction value as an output value from said control system;
- a frequency identification section that performs analysis based on a frequency response method and identifies a frequency of said torque disturbance exhibiting a specified phase lag;
- an input/output gain identification section that identifies an input/output gain at said frequency identified by said frequency identification section; and
- a magnification factor resetting section that resets said adjustment magnification factor by multiplying said adjustment magnification factor by a value obtained by subtracting 1 from a ratio between said identified input/output gain and said specified target value of said input/output gain, then multiplying a specified correction coefficient that is less than 1, and finally adding 1.

16. The servo motor controller according to claim 15, wherein said torque disturbance represents a sine wave.

17. The servo motor controller according to claim 15, wherein said frequency identified by said frequency identification section is a frequency at which said phase lag is about −180° or has a smaller absolute value, and wherein, with said specified target value of said input/output gain set to a specified value of 0 dB or lower, an adjustment is performed so as to bring a input/output gain at said frequency identified by said frequency identification section closer to said specified target value of the input/output gain.

18. The servo motor controller according to claim 15, further comprising a maximum gain calculation section that obtains a maximum value of said input/output gain at a frequency lower than said frequency identified by said frequency identification section, wherein, when said maximum value is greater than a specified value of 0 dB or higher, said adjustment magnification factor of said velocity control section is decreased by a ratio of said maximum value to said specified value of 0 dB or higher.

19. The servo motor controller according to claim 15, wherein, when an input/output gain at a resonant frequency exceeds a specified value at a frequency higher than said frequency identified by said frequency identification section, said adjustment magnification factor of said velocity control section is decreased in accordance with a ratio of said input/output gain at said resonant frequency to said specified value.

20. The servo motor controller according to claim 15, wherein, after said adjustment magnification factor has been reset, an input/output gain is determined by using a new adjustment magnification factor, and resetting of said adjustment magnification factor is repeated to bring said input/output gain determined by using a new adjustment magnification factor closer to said specified target value of said input/output gain until resetting is terminated when said input/output gain determined by using a new adjustment magnification factor enters into a specified range including said specified target value of the input/output gain.

21. A servo motor controller having automatic gain adjustment function for adjusting a velocity control gain, comprising:
- a velocity control section that calculates a torque instruction value by multiplying a velocity deviation which is a difference between a velocity instruction value and a velocity detection value by said velocity control gain which is a product of an operation constant and an adjustment magnification factor which has been set in advance for adjusting said operation constant;
- a disturbance addition section that adds a velocity disturbance at a specified frequency to said velocity instruction value;
- an input/output characteristic estimation section that estimates an input/output gain and a phase lag with said velocity disturbance as an input value to a control system and with said velocity instruction value as an output value from said control system;
- a frequency identification section that performs analysis based on a frequency response method and identifies a frequency of said velocity disturbance exhibiting a specified phase lag;
- an input/output gain identification section that identifies an input/output gain at said frequency identified by said frequency identification section; and
- a magnification factor resetting section that resets said adjustment magnification factor by multiplying said adjustment magnification factor by a value obtained by subtracting 1 from a ratio between said identified input/output gain and said specified target value of said input/output gain, then multiplying a specified correction coefficient that is less than 1, and finally adding 1.

22. The servo motor controller according to claim 21, wherein said velocity disturbance represents a sine wave.

23. The servo motor controller according to claim 21, wherein said frequency identified by said frequency identification section is a frequency at which said phase lag is about −180° or has a smaller absolute value, and wherein, with said specified target value of said input/output gain set to a specified value of 0 dB or lower, an adjustment is performed so as to bring a input/output gain at said frequency identified by said frequency identification section closer to said specified target value of the input/output gain.

24. The servo motor controller according to claim 21, further comprising a maximum gain calculation section that obtains a maximum value of said input/output gain at a frequency lower than said frequency identified by said frequency identification section, wherein, when said maximum value is greater than a specified value of 0 dB or higher, said adjustment magnification factor of said velocity control section is decreased by a ratio of said maximum value to said specified value of 0 dB or higher.

25. The servo motor controller according to claim 21, wherein, when an input/output gain at a resonant frequency exceeds a specified value at a frequency higher than said frequency identified by said frequency identification section, said adjustment magnification factor of said velocity control section is decreased in accordance with a ratio of said input/output gain at said resonant frequency to said specified value.

26. The servo motor controller according to claim 21, wherein, after said adjustment magnification factor has been reset, an input/output gain is determined by using a new adjustment magnification factor, and resetting of said adjustment magnification factor is repeated to bring said input/output gain determined by using a new adjustment magnification factor closer to said specified target value of said input/output gain until resetting is terminated when said input/output gain determined by using a new adjustment magnification factor enters into a specified range including said specified target value of the input/output gain.

* * * * *